(12) United States Patent
Katsumata

(10) Patent No.: US 11,273,760 B2
(45) Date of Patent: Mar. 15, 2022

(54) VEHICLE INTERIOR ILLUMINATION SYSTEM

(71) Applicant: YAZAKI CORPORATION, Tokyo (JP)

(72) Inventor: Kenichi Katsumata, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/183,224

(22) Filed: Feb. 23, 2021

(65) Prior Publication Data

US 2021/0268960 A1    Sep. 2, 2021

(30) Foreign Application Priority Data

Feb. 28, 2020    (JP) .............................. JP2020-034113

(51) Int. Cl.
*B60Q 3/85*    (2017.01)
*H05B 47/19*    (2020.01)
(Continued)

(52) U.S. Cl.
CPC ............... *B60Q 3/85* (2017.02); *H05B 47/16* (2020.01); *H05B 47/165* (2020.01); *H05B 47/19* (2020.01); *B60Q 2900/30* (2013.01)

(58) Field of Classification Search
CPC .. H05B 45/20; H05B 47/175; H05B 33/0815; H05B 33/0845; H05B 33/0857; H05B 45/10; H05B 47/18; H05B 47/105; H05B 47/125; H05B 47/16; H05B 47/19; H05B 39/047; H05B 45/22; H05B 45/50;
(Continued)

(56) References Cited

U.S. PATENT DOCUMENTS

2010/0296285 A1* 11/2010 Chemel ................... F21V 14/02
                                                            362/235
2015/0345765 A1* 12/2015 Horst ...................... F21S 2/005
                                                            362/362
(Continued)

FOREIGN PATENT DOCUMENTS

CN    206442569 U    8/2017
DE    10037131 A1    2/2002
(Continued)

*Primary Examiner* — Monica C King
(74) *Attorney, Agent, or Firm* — Kenealy Vaidya LLP

(57) ABSTRACT

A vehicle interior illumination system includes: a master control unit; slave control units configured to perform multiplex communication with the master control unit and control a light source mounted on a vehicle in accordance with an instruction of the master control unit; a multiplex communication line configured to connect the master control unit to the slave control units; and a wireless control unit that is connected to the multiplex communication line and configured to perform wireless communication with an external device. The wireless control unit is configured to receive setting information on vehicle interior illumination from the external device and transmit the setting information to the master control unit via the multiplex communication line. The master control unit is configured to transmit a control instruction to the slave control unit to control the light source in accordance with the setting information.

3 Claims, 3 Drawing Sheets

(51) Int. Cl.
*H05B 47/16* (2020.01)
*H05B 47/165* (2020.01)

(58) Field of Classification Search
CPC ...... H05B 47/11; H05B 47/165; H05B 47/22; H04W 4/80; H04W 4/029; H04W 12/06; H04W 4/023; H04W 4/33; H04W 4/38; H04W 4/025; H04W 64/003; H04W 84/18; H04W 84/20; H04W 8/005; H04W 24/08; H04W 24/10; H04W 4/02; H04W 4/021; H04W 4/08; H04W 4/14; H04W 4/40; H04W 4/44; H04W 4/46; H04W 52/0229; H04W 52/322; H04W 56/0015; H04W 64/00; H04W 76/14; H04W 8/18; H04W 12/03; H04W 12/037; H04W 12/068; H04W 12/069; H04W 12/86; H04W 16/14; H04W 40/14; H04W 48/04; H04W 48/12; H04W 4/024; H04W 4/18; H04W 4/20; H04W 4/30; H04W 4/35; H04W 4/48; H04W 4/70; H04W 4/90; H04W 52/0216; H04W 52/0245; H04W 52/0254; H04W 52/028; H04W 56/001; H04W 56/002; H04W 56/0055; H04W 56/006; H04W 64/006; H04W 72/044; H04W 72/0446; H04W 72/1263; H04W 72/1268; H04W 74/002; H04W 76/15; H04W 76/28; H04W 84/042; H04W 88/06; H04W 88/085; H04W 88/16; H04W 92/06; H04L 67/02; H04L 63/029; H04L 65/4084; H04L 67/2838; H04L 67/42; H04L 12/4633; H04L 67/10; H04L 67/28; H04L 12/2803; H04L 49/40; H04L 61/1511; H04L 61/2007; H04L 61/2514; H04L 61/2553; H04L 61/256; H04L 61/2575; H04L 61/2585; H04L 61/2589; H04L 61/2592; H04L 61/609; H04L 63/0272; H04L 63/0281; H04L 63/164; H04L 65/80; H04L 67/025; H04L 67/06; H04L 67/1008; H04L 67/1021; H04L 67/141; H04L 67/142; H04L 67/2814; H04L 67/2847; H04L 67/288; H04L 67/2885; H04L 67/32; H04L 67/327; H04L 67/40; H04L 69/16; H04L 69/162; H04L 69/325; H04L 69/326; H04L 69/329; H04L 2012/2841; H04L 65/60; H04L 65/608; H04L 67/12; H04L 9/32; H04L 12/1845; H04L 12/189; H04L 12/2805; H04L 12/281; H04L 12/2818; H04L 12/2834; H04L 12/4625; H04L 12/4641; H04L 12/6418; H04L 1/0071; H04L 2012/2849; H04L 2209/80; H04L 2209/805; H04L 2209/84; H04L 25/00; H04L 41/044; H04L 41/0809; H04L 41/0813; H04L 41/0816; H04L 41/0893; H04L 43/08; H04L 43/50; H04L 45/586; H04L 45/745; H04L 5/0051; H04L 5/0055; H04L 63/02; H04L 63/0227; H04L 63/0435; H04L 63/061; H04L 63/08; H04L 63/0823; H04L 63/083; H04L 63/0876; H04L 63/105; H04L 63/108; H04L 63/12; H04L 63/123; H04L 65/4092; H04L 65/601; H04L 67/125; H04L 67/2823; H04L 67/34; H04L 7/0066; H04L 9/0838; H04L 9/085; H04L 9/0852; H04L 9/0861; H04L 9/088; H04L 9/0894; H04L 9/3226; H04L 9/3297

See application file for complete search history.

(56) References Cited

U.S. PATENT DOCUMENTS

| | | |
|---|---|---|
| 2017/0135175 A1 | 5/2017 | Sugimoto et al. |
| 2017/0223807 A1* | 8/2017 | Recker .................. H05B 47/19 |
| 2019/0135173 A1 | 5/2019 | Bauer et al. |
| 2019/0305984 A1 | 10/2019 | Nakagawa et al. |

FOREIGN PATENT DOCUMENTS

| | | |
|---|---|---|
| DE | 102016211737 A1 | 1/2018 |
| JP | 2017-91782 A | 5/2017 |
| WO | 2017/062691 A1 | 4/2017 |

* cited by examiner

VEHICLE INTERIOR ILLUMINATION SYSTEM

CROSS-REFERENCE TO RELATED APPLICATIONS

This application claims priority of Japanese Patent Application No. 2020-034113 filed on Feb. 28, 2020, the entire contents of which are incorporated herein by reference.

FIELD

One or more embodiments of the present invention relate to a vehicle interior illumination system in which a master control unit and a plurality of slave control units that control a light source in accordance with an instruction from the master control unit perform multiplex communication.

BACKGROUND

For example, in a vehicle such as a passenger vehicle, there are cases where a plurality of parts in a vehicle interior are illuminated, a vicinity of a door is illuminated as the door is opened or closed, various in-vehicle devices are illuminated, and illumination for decoration is performed. As a vehicle interior illumination system that controls such a large number of light sources, a vehicle interior illumination system that employs a master-slave method has been proposed (for example, JP-A-2017-091782).

In the above-described vehicle interior illumination system using the master-slave method, it is considered that an illumination color at the time of turning on a light source is stored in a memory in advance in a slave control unit in order to reduce communication. In this case, in response to reception, for example, of a turn-on instruction from a master control unit, the slave control unit controls turning on the light source with the illumination color stored in the memory.

SUMMARY

However, in the vehicle interior illumination system, it is not possible to change the illumination color stored in the memory, that is, setting information on illumination. Therefore, it is considered to change the setting information by using an external device connected to the master control unit at the time of failure diagnosis. However, in order to connect the external device to the master control unit, a user needs to go to a dealer. Therefore, there is a problem that the user cannot easily change the setting information such as an illumination color in the vehicle interior.

One or more embodiments of the present invention have been made in view of the above circumstances, and an object thereof is to provide a vehicle interior illumination system in which a user can easily change setting information.

One or more embodiments of the present invention provide a vehicle interior illumination system including: a master control unit; a plurality of slave control units configured to perform multiplex communication with the master control unit and control a light source mounted on a vehicle in accordance with an instruction of the master control unit; a multiplex communication line configured to connect the master control unit to the plurality of slave control units; and a wireless control unit that is connected to the multiplex communication line and configured to perform wireless communication with an external device, wherein the wireless control unit is configured to receive setting information on vehicle interior illumination from the external device and transmit the setting information received from the external device to the master control unit via the multiplex communication line, and wherein the master control unit is configured to transmit a control instruction to the slave control unit to control the light source in accordance with the setting information received from the wireless control unit.

According to one or more embodiments of the present invention, it is possible to provide a vehicle interior illumination system in which a user can easily change setting information.

One or more embodiments of the present invention have been briefly described above. Details of one or more embodiments of the present invention are further clarified by reading a mode for carrying out the invention (hereinafter, referred to as "embodiment") described below with reference to attached drawings.

DETAILED DESCRIPTION

A specific embodiment according to the present invention will be described below with reference to the drawings.

Figure 1:
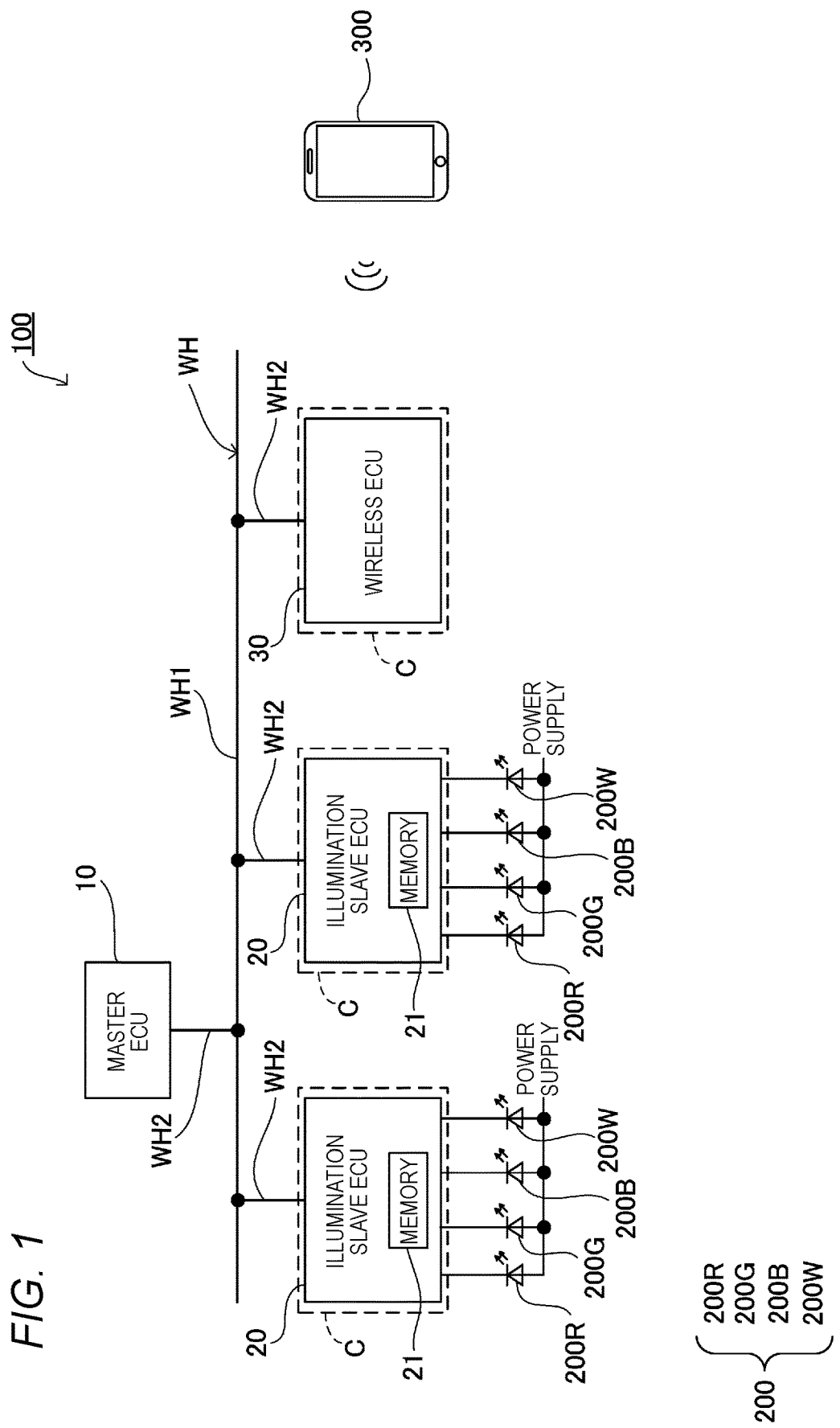
FIG. 1 is a block diagram showing an example of a vehicle interior illumination system according to the present embodiment.

FIG. 1 shows a configuration example of a vehicle interior illumination system 100 according to an embodiment of the present invention. The vehicle interior illumination system 100 shown in FIG. 1 is mounted on a vehicle such as a passenger vehicle and is used to control various pieces of illumination in a vehicle interior.

The vehicle interior illumination system 100 needs to control a large number of light sources 200 mounted on a vehicle. The vehicle interior illumination system 100 includes one master ECU (a master control unit) 10, a plurality of illumination slave ECUs (slave control units) 20, a wireless ECU 30 (a wireless control unit), and a wire harness WH.

The master ECU 10 performs multiplex communication with the plurality of illumination slave ECUs 20 (hereinafter, abbreviated as "slave ECUs 20") and the wireless ECU 30. In the present embodiment, communication among the master ECU 10, the slave ECU 20, and the wireless ECU 30 is performed using Clock Extension Peripheral Interface (CXPI) communication. The master ECU 10 is configured with, for example, a microcomputer and executes predetermined control required for the slave ECU 20 in accordance with a program incorporated in advance. The master ECU 10 transmits a control instruction related to control of the light source 200 (for example, a turn-on instruction, and a turn-off instruction) to the slave ECU 20 based on state monitoring of various switches on the vehicle that can be operated by a user (a driver, or the like), state monitoring of various sensors that detect various states, and information input from a host ECU (not shown).

The slave ECU 20 controls the light source 200 in accordance with the control instruction from the master ECU 10. The light source 200 includes built-in LED elements 200R, 200G, 200B, and 200W that emit light at wavelengths of, for example, R (red), G (green), B (blue), and W (white), respectively. That is, the slave ECU 20 is configured with a full-color LED device.

The slave ECU 20 is configured with, for example, a microcomputer and controls the light source 200 in accordance with a program incorporated in advance. The slave ECU 20 includes a memory 21 (a storage unit) that stores a plurality of pieces of setting information (an illumination color, illuminance, fade-in time, fade-out time, and the like) on illumination of the light source 200. In response to reception of the turn-on instruction or the turn-off instruction from the master ECU 10, the slave ECU 20 causes the light source 200 to emit light or be turned off in accordance with the plurality of pieces of setting information stored in the memory 21.

Specifically, in response to reception of the turn-on instruction from the master ECU 10, the slave ECU 20 turns on the light source 200 in the illumination color, and gradually increases illuminance of the light source 200 so as to reach the illuminance when the fade-in time elapses. Further, in response to reception of the turn-off instruction from the master ECU 10, the slave ECU 20 gradually decreases the illuminance of the light source 200 such that the light source 200 is turned off when the fade-out time elapses.

The wireless ECU 30 is provided to enable wireless communication with an external device 300 such as a smartphone or tablet by BT communication (Bluetooth (registered trademark)) or the like. A color change application is installed in the external device 300. In response to a start-up of the color change application, the user can input an illumination color (setting information) desired to be changed to the external device 300 and can transmit the input illumination color to the wireless ECU 30. The wireless ECU 30 is an ECU provided for receiving an illumination color (setting information) desired to be changed by the user by wireless communication with the external device 300 and changing an illumination color stored in the memory 21 of the slave ECU 20.

Figure 2:
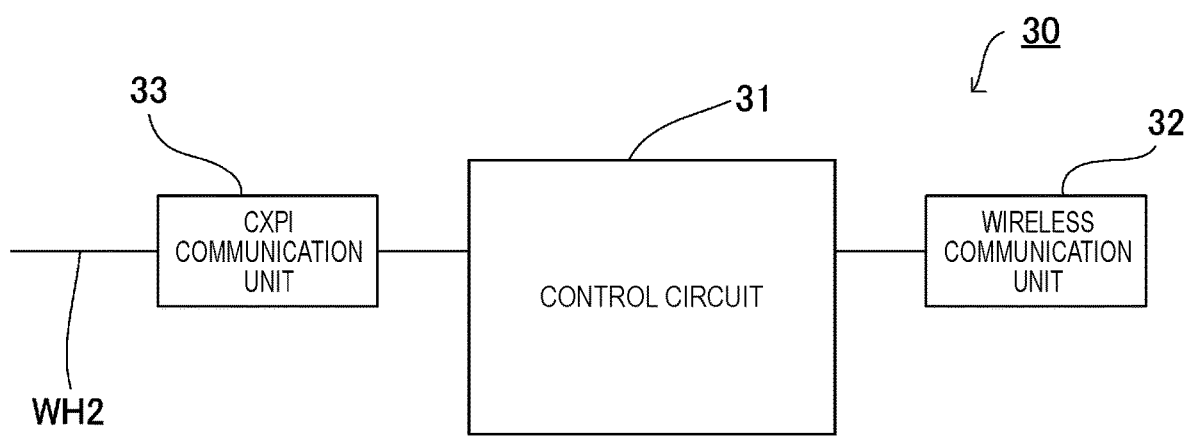
FIG. 2 is a block diagram showing details of a wireless ECU shown in FIG. 1.

As shown in FIG. 2, the wireless ECU 30 includes a control circuit 31, a wireless communication unit 32, and a CXPI communication unit 33. The control circuit 31 is configured with, for example, a microcomputer, and communicates with the external device 300 and the master ECU 10 in accordance with a program incorporated in advance. The wireless communication unit 32 is a communication unit for performing wireless BT communication with the external device 300. The CXPI communication unit 33 is a communication unit for performing CXPI communication with the master ECU 10.

The wire harness WH connects the master ECU 10 to the plurality of slave ECUs 20 and the wireless ECU 30.

As shown in FIG. 1, the wire harness WH includes a trunk line WH1 and a plurality of branch lines WH2 that branch from the trunk line WH1. The master ECU 10 is connected to one of the plurality of branch lines WH2. Further, connectors C are provided at terminals of the plurality of branch lines WH2, and the slave ECUs 20 and the wireless ECU 30 are built in the connectors C one by one.

The wire harness WH includes a power supply line, a ground line, and a communication line (a multiplex communication line). Therefore, multiplex communication can be performed among the master ECU 10, the slave ECU 20, and the wireless ECU 30 by using the communication line of the wire harness WH.

Figure 3:
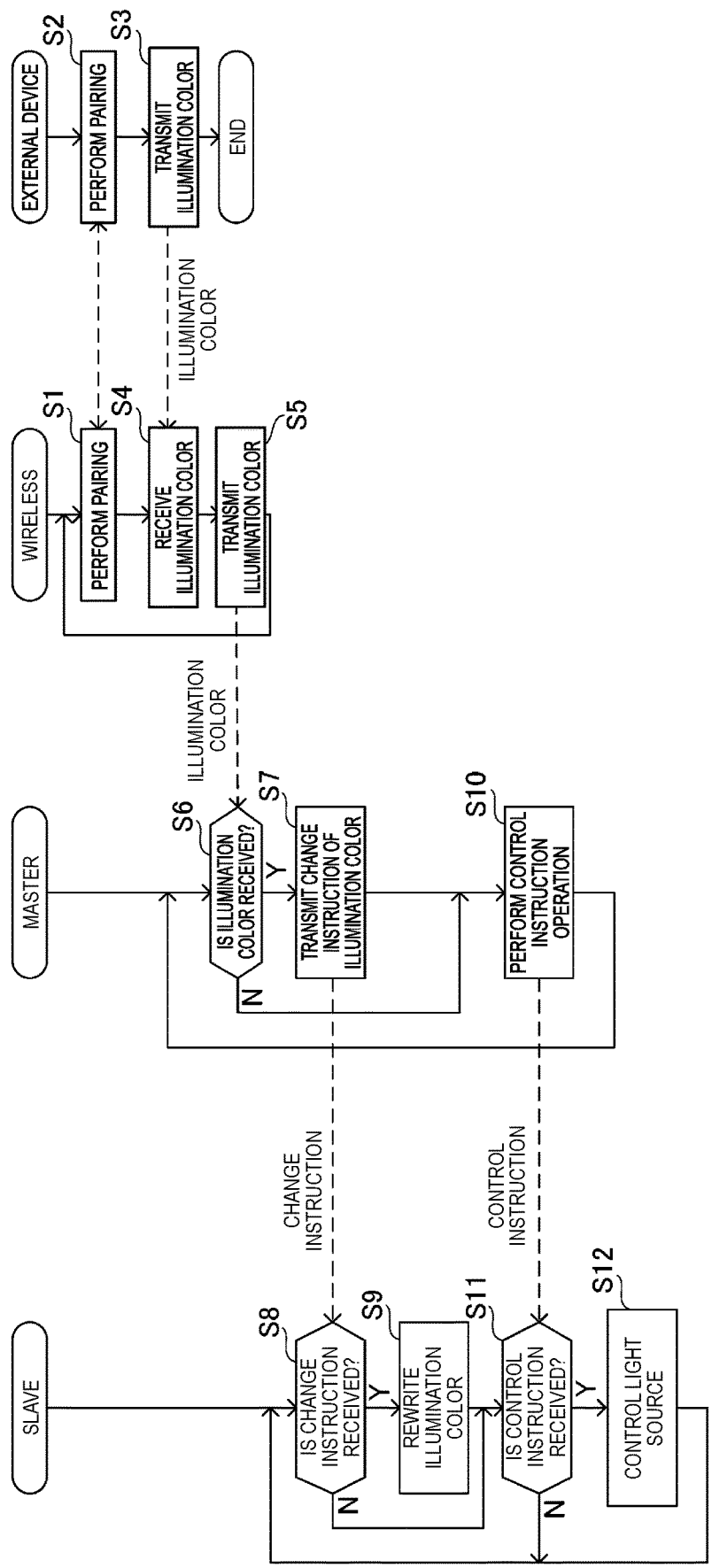
FIG. 3 is a flowchart showing a processing procedure of a master ECU, a slave ECU, the wireless ECU, and an external device shown in FIG. 1.

Next, operations of the vehicle interior illumination system 100 having the above-described configuration will be described below with reference to a flowchart of FIG. 3. The external device 300 and the wireless ECU 30 are paired in response to an operation of the user (S1, S2). Thereafter, in response to operation of the user on the external device 300 to start up the color change application and input an illumination color desired to be changed, the external device 300 transmits the input illumination color to the wireless ECU 30 (S3) and ends the processing.

In response to reception of the illumination color via the wireless communication unit 32 (S4), the wireless ECU 30 converts illumination color data into CXPI data by using the CXPI communication unit 33 and transmits the converted CXPI data to the master ECU 10 (S5). In response to reception of the illumination color (Y in S6), the master ECU 10 transmits an instruction to change the received illumination color to the slave ECU 20 (S7). In response to reception of the illumination color and the change instruction (Y in S8), the slave ECU 20 rewrites an illumination color stored in the memory 21 to the received illumination color (S9).

As described above, the master ECU 10 determines whether to transmit a control instruction to the slave ECU 20 based on the states of the various switches and sensors and the information from the host ECU, and performs a control instruction operation for transmitting the control instruction (S10). In response to reception of the control instruction from the master ECU 10 (Y in S11), the slave ECU 20 controls the light source 200 in accordance with the control instruction and setting information stored in the memory 21 (S12). In S12, since the master ECU 10 controls the light source 200 in accordance with the setting information, if the illumination color is rewritten in S9, the master ECU 10 causes the light source 200 to emit light with the rewritten illumination color.

According to the above-described embodiment, the wireless ECU 30 transmits the illumination color (the setting information) received from the external device 300 to the master ECU 10, and the master ECU 10 transmits the change instruction to the slave ECU 20 such that the light source emits light in accordance with the illumination color received from the wireless ECU 30. Accordingly, the user can easily change an illumination color of the light source 200 by using the external device 300 such as the smartphone or the tablet. Further, according to the above-described embodiment, the wireless ECU 30 can be easily added to the vehicle interior illumination system 1 simply by increasing the number of branch lines WH2 of the wire harness WH by one and connecting the wireless ECU 30.

According to the above-described embodiment, in response to reception of the illumination color from the wireless ECU 30, the master ECU 10 transmits, to the slave ECU 20, the instruction to rewrite the illumination color in the setting information stored in the memory 21 to the received illumination color. Accordingly, the user can easily rewrite the setting information stored in the slave ECU 20 by using the external device 300.

According to the above-described embodiment, the communication among the master ECU 10, the slave ECU 20, and the wireless ECU 30 is performed using the CXPI communication. The CXPI communication is a method in which a node is easily added. Accordingly, it is possible to easily add the wireless ECU 30 to the vehicle interior illumination system 100 to change the setting information.

The present invention is not limited to the above-described embodiment, and modifications, improvements, and the like can be made as appropriate. In addition, materials, shapes, sizes, numbers, arrangement places, and the like of elements in the above-described embodiment are optional and not limited as long as the object of the present invention can be achieved.

According to the above-described embodiment, the vehicle interior illumination system 100 is configured to be able to change the illumination color, but the present invention is not limited thereto. Other setting information (the fade-in time, the fade-out time, and the illuminance) may be changed. That is, at least one or more of the illumination color, the fade-in time, the fade-out time, and the illuminance may be changed. Further, the illumination color, the fade-in time, the fade-out time, and setting information other than illumination may be changed.

Although the slave ECU 20 controls the light source 200 to be constantly turned on in response to the turn-on instruction, the present invention is not limited thereto. For example, the slave ECU 20 may control the light source 200 to blink at the time of turning on the light source 200, or to constantly turn on the light source 200 after blinking the light source 200. In this case, the setting information includes blinking times, a blinking interval, and the like.

Further, according to the above-described embodiment, the external device 300 is configured to be able to change only the illumination color, but the present invention is not limited thereto. The external device 300 may be provided such that one of a plurality of illumination patterns in which two or more of the plurality of pieces of setting information (the fade-in time, the fade-out time, the illuminance, the illumination color, and the like) are combined can be selected and changed. In this case, the external device 300 transmits fade-in time, fade-out time, illuminance, an illumination color, and the like corresponding to a selected illumination pattern as the setting information.

The external device 300 may transmit identification information attached to the plurality of illumination patterns as the setting information. In this case, the memory 21 of the slave ECU 20 stores fade-in time, fade-out time, illuminance, and illumination colors corresponding to the plurality of illumination patterns. The slave ECU 20 may control the light source 200 by reading out fade-in time, fade-out time, illuminance, and an illumination color of an illumination pattern corresponding to identification information in accordance with a control instruction of the master ECU 10. Accordingly, the user can easily change illumination to desired illumination only by selecting an illumination pattern by using the external device 300.

Further, according to the above-described embodiment, the communication among the master ECU 10, the slave ECU 20, and the wireless ECU 30 is performed using the CXPI communication, but the present invention is not limited thereto. Other multiplex communication methods may be used.

Here, the vehicle interior illumination system according to the embodiment of the present invention described above will be briefly summarized and listed in the following the configurations [1] to [5].

[1] A vehicle interior illumination system (100) including:
a master control unit (10);
a plurality of slave control units (20) configured to perform multiplex communication with the master control unit (10) and control a light source (200) mounted on a vehicle in accordance with an instruction of the master control unit (10);
a multiplex communication line (WH) configured to connect the master control unit (10) to the plurality of slave control units (20); and
a wireless control unit (30) that is connected to the multiplex communication line (WH) and configured to perform wireless communication with an external device (300),
in which the wireless control unit (30) is configured to receive setting information on vehicle interior illumination from the external device (300) and transmit the setting information received from the external device (300) to the master control unit (10) via the multiplex communication line (WH), and
in which the master control unit (10) is configured to transmit a control instruction to the slave control unit (20) to control the light source (200) in accordance with the received setting information received from the wireless control unit (30).

[2] The vehicle interior illumination system (100) according to [1],
in which the setting information includes at least one of an illumination color, fade-in time, fade-out time, and illuminance of the light source (200).

[3] The vehicle interior illumination system (100) according to [1],
in which the setting information is information indicating one of a plurality of predetermined illumination patterns.

[4] The vehicle interior illumination system (100) according to any one of [1] to [3],
in which the slave control unit (20) includes a storage unit (21) configured to store the setting information, and controls the light source (200) in accordance with the setting information stored in the storage unit (21) in response to reception of the control instruction from the master control unit (10), and
in which in response to reception of the setting information from the wireless control unit (30), the master control unit (10) transmits, to the slave control unit (20), an instruction to rewrite the setting information stored in the storage unit (21) to the setting information received from the wireless control unit (30).

[5] The vehicle interior illumination system (100) according to any one of [1] to [4],
in which communication among the master control unit (10), the slave control unit (20), and the wireless control unit (30) is performed using a clock extension peripheral interface communication.

According to the vehicle interior illumination system having the configuration of above [1], the wireless control unit wirelessly receives the setting information from the external device and transmits the received setting information to the master control unit. The master control unit transmits the instruction to the slave control unit such that the light source emits light in accordance with the setting information received from the wireless control unit. Accordingly, a user can easily change the setting information by using the external device.

According to the vehicle interior illumination system having the configuration of above [2], the setting information includes at least one of the illumination color, the fade-in time, the fade-out time, and the illuminance of the light source. Accordingly, the user can easily change the illumination color, the fade-in time, the fade-out time, and the illuminance by using the external device.

According to the vehicle interior illumination system having the configuration of above [3], the setting information is the information indicating one of the plurality of predetermined illumination patterns. Accordingly, the user can easily change illumination to favorite illumination only by selecting an illumination pattern by using the external device.

According to the vehicle interior illumination system having the configuration of above [4], in response to reception of the setting information from the wireless control unit, the master control unit transmits, to the slave control unit, the instruction to rewrite the setting information stored in the storage unit to the received setting information. Accordingly, the user can easily rewrite the setting information stored in the slave control unit by using the external device.

According to the vehicle interior illumination system having the configuration of above [5], the communication among the master control unit, the slave control unit, and the wireless control unit is performed using the CXPI communication. Accordingly, it is possible to easily add a wireless control unit to the vehicle interior illumination system to change the setting information.

The invention claimed is:

1. A vehicle interior illumination system comprising:
   a master control unit;
   a plurality of slave control units configured to perform multiplex communication with the master control unit and control a light source mounted on a vehicle in accordance with an instruction of the master control unit;
   a multiplex communication line configured to connect the master control unit to the plurality of slave control units; and
   a wireless control unit that is connected to the multiplex communication line and configured to perform wireless communication with an external device,
   wherein the wireless control unit is configured to receive setting information on vehicle interior illumination from the external device and transmit the setting information received from the external device to the master control unit via the multiplex communication line,
   wherein the master control unit is configured to transmit a control instruction to the slave control unit to control the light source in accordance with the setting information received from the wireless control unit,
   wherein the slave control unit comprises a storage unit configured to store the setting information, and controls the light source in accordance with the setting information stored in the storage unit in response to reception of the control instruction from the master control unit,
   wherein in response to reception of the setting information from the wireless control unit, the master control unit transmits, to the slave control unit, an instruction to rewrite the setting information stored in the storage unit to the setting information received from the wireless control unit,
   wherein the setting information is information indicating one of a plurality of predetermined illumination patterns,
   wherein the setting information received from the external device includes identification information,
   wherein the slave control unit is configured to control the light source by reading out an illumination pattern, of the plurality of predetermined illumination patterns, corresponding to the identification information,
   wherein the storage unit of the slave control unit is configured to store the plurality of predetermined illumination patterns in which two or more of fade-in time, fade-out time, illuminance, and illumination colors are combined, and
   wherein the slave control unit is configured to control the light source by reading out fade-in time, fade-out time, illuminance, and an illumination color of the illumination pattern corresponding to the identification information.

2. The vehicle interior illumination system according to claim 1,
   wherein the setting information comprises at least one of an illumination color, fade-in time, fade-out time, and illuminance of the light source.

3. The vehicle interior illumination system according to claim 1,
   wherein communication among the master control unit, the slave control unit, and the wireless control unit is performed using a clock extension peripheral interface communication.

* * * * *